2,947,183
Patented Aug. 2, 1960

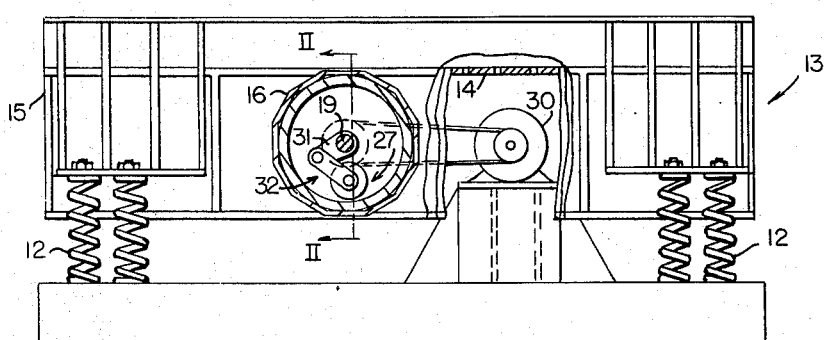
Fig. I
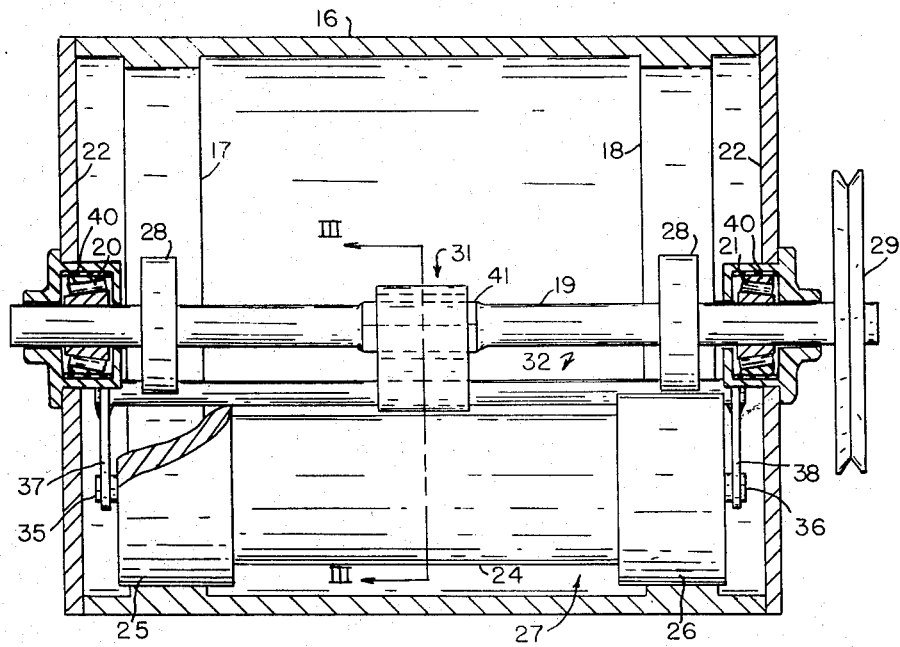
Fig. II
INVENTORS.
ROBERT M. CARRIER JR.
JOHN M. MORRIS
BY
Marshall, Marshall & Yeasting
ATTORNEYS

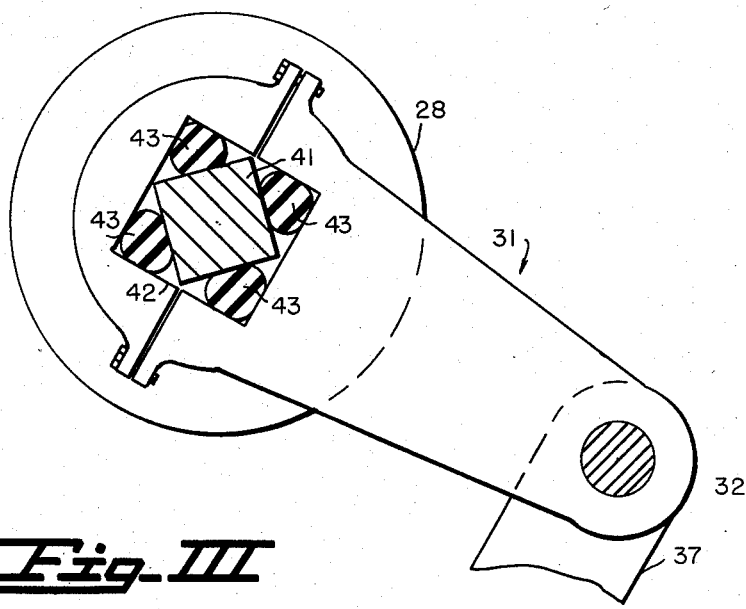
Fig. III
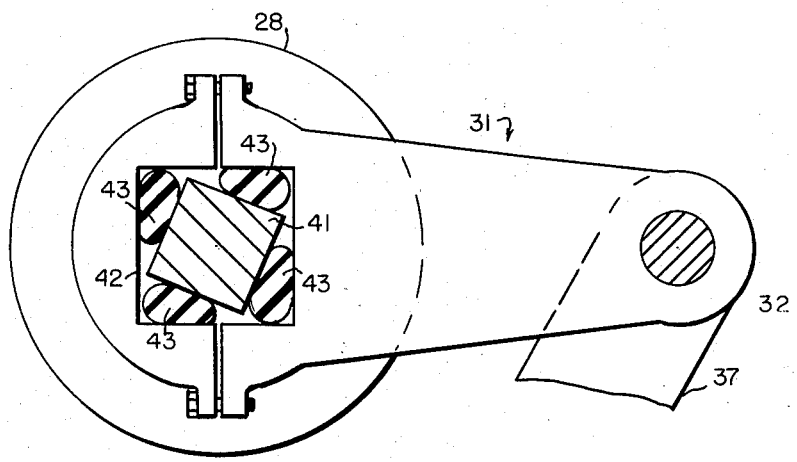
Fig. IV
INVENTORS.
ROBERT M. CARRIER JR.
JOHN M. MORRIS
BY
Marshall, Marshall & Yeasting
ATTORNEYS Aug. 2, 1960   R. M. CARRIER, JR., ET AL   2,947,183
VIBRATION IMPARTING MECHANISM
Filed Sept. 30, 1957   5 Sheets-Sheet 3
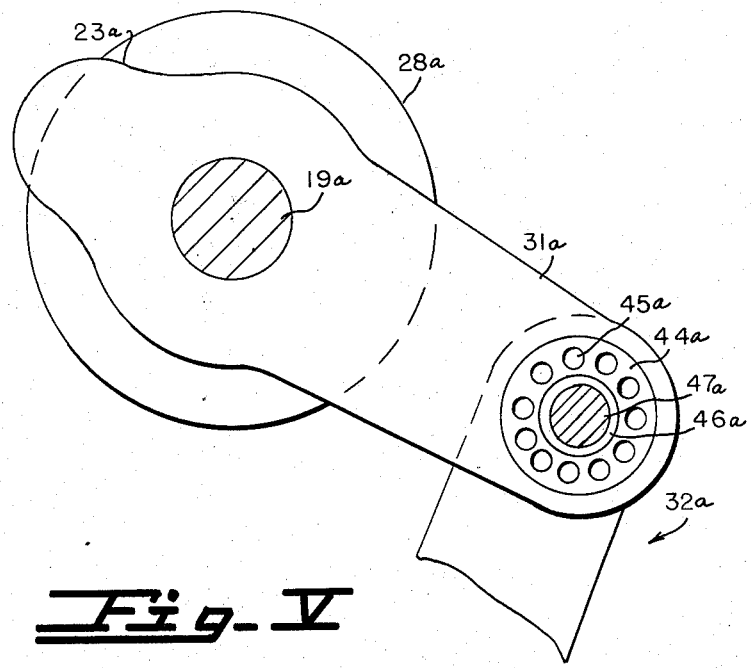
Fig. V
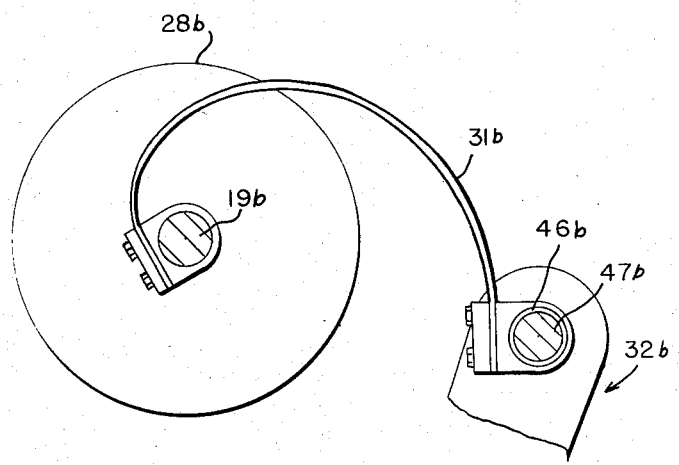
Fig. VI
INVENTORS.
ROBERT M. CARRIER JR.
JOHN M. MORRIS
BY
Marshall, Marshall & Yeasting
ATTORNEYS Aug. 2, 1960  R. M. CARRIER, JR., ET AL  2,947,183
VIBRATION IMPARTING MECHANISM
Filed Sept. 30, 1957  5 Sheets-Sheet 4
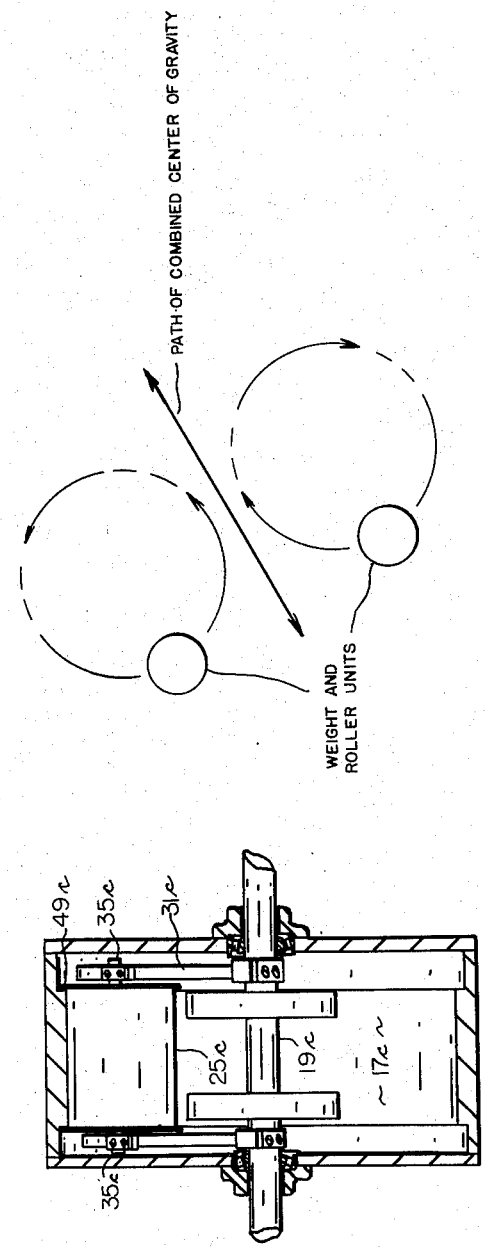
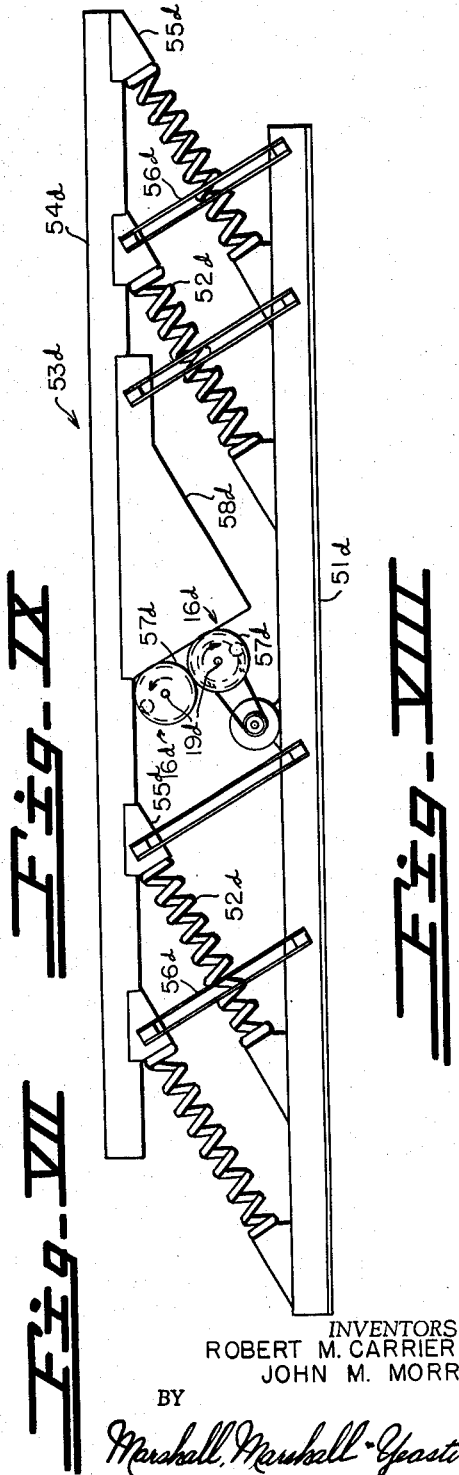
INVENTORS.
ROBERT M. CARRIER JR.
JOHN M. MORRIS
BY
Marshall, Marshall & Yeasting
ATTORNEYS

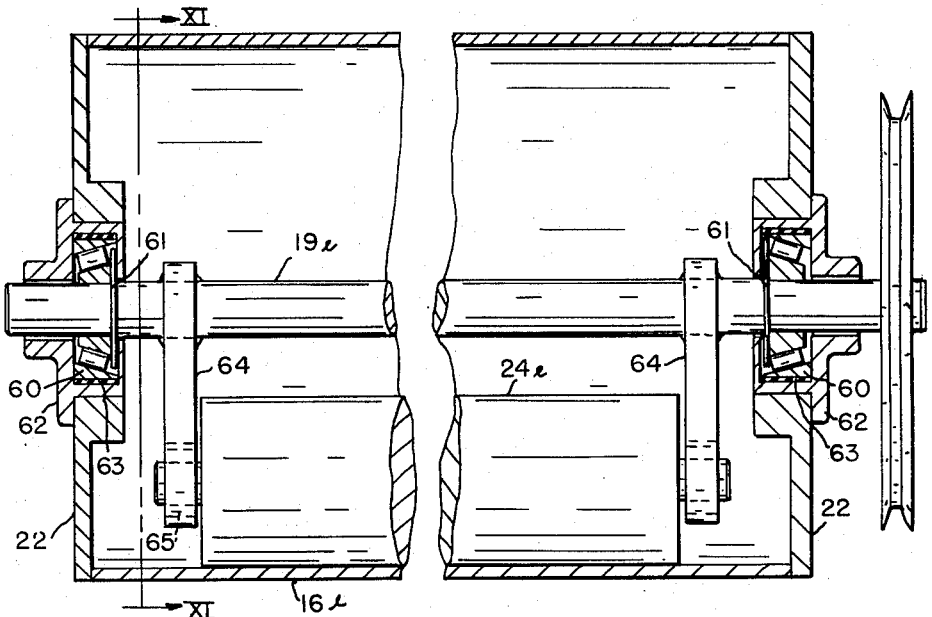
*Fig. X*
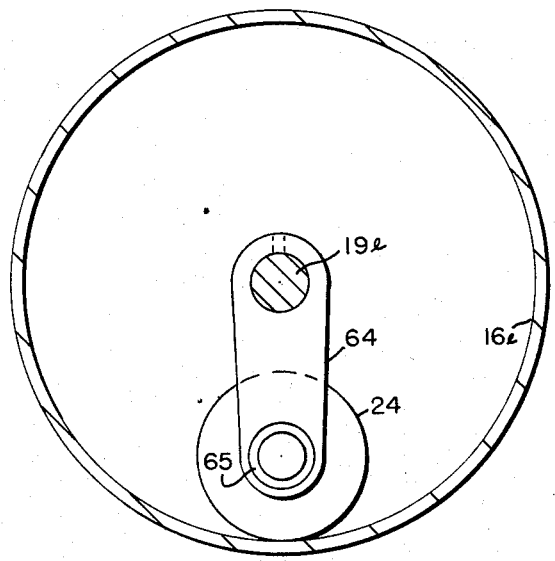
*Fig. XI*
INVENTORS.
ROBERT M. CARRIER JR.
JOHN M. MORRIS
BY
ATTORNEYS

United States Patent Office

2,947,183

VIBRATION IMPARTING MECHANISM

Robert M. Carrier, Jr., and John M. Morris, Louisville, Ky., assignors, by mesne assignments, to Chain Belt Company, Milwaukee, Wis., a corporation of Wisconsin Filed Sept. 30, 1957, Ser. No. 687,079

15 Claims. (Cl. 74—61)

This invention relates to mechanism for imparting vibratory movement to shakeout devices, screens, conveyors and other vibratory machines, particularly heavy machines such as are used in foundries for shaking out molding flasks and such as are used for screening broken stone and coal and for processing and conveying other heavy, lumpy material.

Vibratory movement of such machines is commonly induced by revolution of eccentric weights that are revolved in circular paths by motor driven shafts. The centrifugal forces exerted by such weights revolving at high speeds are enormous, often reaching magnitudes of many tons. In order to minimize the destructive effects of such forces on bearings of the drive shafts that revolve the weights, devices have been developed in which the weights have cylindrical or spherical surfaces that roll around inside annular tracks which are rigidly fixed to the structures to be vibrated. In such devices the centrifugal forces are taken by the annular tracks rather than by the bearings of the shafts that revolve the weights.

Other abuse, such as shocks that occur when loaded flasks to be shaken out are dropped by a crane upon a shakeout grid, or hammering that occurs when heavy chunks are bounced about on the grid, or strains that occur when speeds of weights or drive shafts are suddenly accelerated or decelerated, still are highly destructive so that liability to breakdown, and replacement requirements cause expense and loss of production during practical utilization of devices heretofore known, even those that incorporate annular tracks which take centrifugal forces that otherwise would have to be withstood by shaft bearings.

It is an object of this invention to provide rolling weight vibration imparting mechanism incorporating means to prevent or reduce the intensity of shocks and other destructive forces to which the drive shaft bearings of heretofore known rolling weight vibration imparting mechanisms are subjected.

Another object is to provide vibration imparting mechanism incorporating means for minimizing torsional stresses to which the drive shaft is subjected.

Another object is to provide vibration imparting mechanism having a drive shaft and a weight and roller unit and incorporating means to minimize stresses in parts connecting the drive shaft to the weight and roller unit and to minimize stresses in parts connecting the drive shaft to a prime mover.

Another object is to provide vibration imparting mechanism incorporating means to reduce the impact of suddenly applied forces upon the bearings.

Another object is to provide a vibration imparting mechanism in which the drive to a weight and roller unit is torsionally resilient.

Other objects and numerous advantages of the invention will be apparent upon perusal of the following specification illustrated by the accompanying drawings, all of which are made schematic for simplicity and clarity. In the drawings:

Fig. I is an elevational view of a shakeout machine embodying the invention, parts being broken away;

Fig. II is an enlarged fragmentary sectional view of vibration imparting mechanism taken as indicated by the line II—II of Fig. I;

Fig. III is a fragmentary sectional view taken as indicated by the line III—III of Fig. II;

Fig. IV is a view of the mechanism shown in Fig. III while under torque load;

Fig. V is a view similar to Fig. III showing a modified form of vibration imparting mechanism embodying the invention, the mechanism being shown as under no torsional stress;

Fig. VI is a view similar to Fig. V showing another modified form of vibration imparting mechanism embodying the invention;

Fig. VII is a view similar to Fig. II showing still another modification of vibration imparting mechanism;

Fig. VIII is an elevational view showing a conveyor embodying still another form of the invention;

Fig. IX is a diagram showing the paths of weight and roller units and the path of their combined center of gravity;

Fig. X is a longitudinal sectional view of another form of the invention; and

Fig. XI is a transverse sectional view as seen from the line XI—XI of Fig. X.

These drawings and this description are intended to illustrate preferred embodiments of the invention but not to limit its scope. In general the invention comprises the combination of a mass to be vibrated, an annular track rigidly fixed to the said mass, a weight and roller unit having a surface adapted to roll around the inside of said annular track, impeller means for rolling said weight and roller unit around the inside of said annular track, a drive shaft for turning said impeller means, and means for reducing the peak intensity of forces transmitted from said weight and roller unit to said drive shaft and forces transmitted from said mass to said drive shaft.

Secured to and rising from the base 11 of the shakeout machine schematically illustrated in Fig. I is a group of helical spring 12 which support a mass 13 to be vibrated. The mass to be vibrated consists of a grid 14 having a frame 15 to which the upper ends of the helical springs 12 are fastened. The distribution of the springs 12 is such that they prevent the mass 13 from being tilted greatly from its condition of level by lopsided loading or by erratically acting forces.

Fixed to the frame 15 in any desired position is a rigid housing 16 within which are annular tracks 17 and 18 that are curved about the axis of a drive shaft 19 which is journaled in bearings 20 and 21 mounted in end walls 22 of the housing 16.

An elongated weight 24 extends substantially parallel to the drive shaft 19 and has rollers 25 and 26 formed upon or affixed to its end thus constituting a functionally integral weight and roller unit 27. The rollers may be of any desired width and may be constructed of any suitable material. They may be of metal so as to roll in metal to metal contact like railroad wheels, or they may be fitted with tires, either solid or pneumatic, of resilient material. They may if desired be merged into a single roller that reaches from end to end of the weight 24 so the weight and roller unit becomes a single roller. The tracks 17 and 18 likewise may be as wide as desired; they too may be merged into a single track.

The drive shaft 19 is equipped with guard wheels 28, the radii of which are a small fraction of an inch shorter than the minimum distance from the axis of the drive shaft 19 to the peripheries of the rollers 25 and 26. The purpose of the guard wheels 28 is to prevent the rollers 25 and 26 of the weight and roller unit 27 from falling away from the tracks 17 and 18 when the machine stops or slows down to a speed at which the centrifugal force acting upon the weight and roller unit is less than the force of gravity.

The drive shaft 19 may be connected directly or through gearing to a motor shaft or it may be equipped with a pulley 29 or a multiple grooved pulley which is belt driven from a motor 30. Variable speed transmission mechanism may of course be interposed between the drive shaft 19 and any prime mover that may be employed.

In the form of device shown in Figs. I, II, III and IV impeller means to roll the rollers 25 and 26 around the insides of the annular tracks 17 consists of an impeller arm 31 extending radially from the drive shaft 19 to a yoke 32, hinged at its center to the outer end of the impeller arm 31. The yoke 32 straddles the weight and roller unit 27, and spindles 35 and 36 projecting axially from the rollers 25 and 26 are journaled by means of anti-friction bearings, in the limbs 37 and 38 of the yoke.

The manner in which the impeller means above described pulls the weight and a roller unit 27 is analogous to the manner in which a two wheeled cart is pulled by its tongue. As a two wheeled cart is kept from deflecting to either side, the weight and roller unit is constantly guided to maintain its correct axial position. Whenever because of jolts or other violent movements the weight and roller unit is bounced askew, the two wheeled car action promptly pulls it back into symmetrical position.

While transfer from the bearings 20 and 21 to the tracks 17 and 18 of the enormous pressures caused by centrifugal force exerted by the rapidly revolving weight and roller unit greatly lengthens the useful lives of the bearings 20 and 21 they still must stand the abuse of vibratory hammering and erratic blows transmitted through the end walls 22 of the housing 16. The objects and material on the grid 14 do not vibrate as a part of the machine but big pieces and little pieces are jounced about with little or no rhythm.

To absorb both vibratory and nonrhythmic hammering which otherwise would crush, peen or "Brinell" the balls or rollers and races of the antifriction bearings 20 and 21, the bearings are mounted in collars 40 of rubber or rubbery material. It is practicable to mount the bearings in such yieldable material because the bearings have been relieved of the centrifugal force exerted by the weight and roller unit. The drive shaft 19 and the parts carried thereby should however be balanced about the axis of rotation of the drive shaft; as by a counter weight 23a or otherwise.

The drive shaft 19 and the mechanism which transmits power to the drive shaft, as well as the mechanism upon which the drive shaft acts also are subjected to sudden and severe stresses. The drive shaft 19 and the weight and roller unit if mounted upon an undisturbed stationary structure would turn at uniform, or gradually varying, speed about a stationary axis. When mounted upon a vibrating structure however the axis about which they turn partakes of the vibratory movement. If the axis moves up while the weight and roller unit is moving down the movement of the unit about the axis is accelerated. If the axis moves down while the weight and roller unit is moving down the movement of the unit about the axis is decelerated. Every such acceleration or deceleration torsionally stresses the drive shaft 19 and stresses the connections between the motor and the drive shaft, as well as the connections between the drive shaft and the weight and roller unit. The stresses are augmented as the vibrating mass and its amplitude of vibration are increased and they are especially severe when the mass or the impulse imparting mechanism is subjected to shocks.

Figs. III and IV illustrate one form of means for minimizing torsional stresses imposed upon the drive shaft 19. In this form of the mechanism the shaft 19 has a portion 41 which is square in cross section and the impeller arm 31 has a square opening 42 which loosely contains the said shaft portion 41. Interposed between the square portion 41 of the shaft 19 and the walls of the square opening 42 in the impeller arm 31 are normally cylindrical pieces 43 of rubber or other highly deformable elastic material. When the shaft 19 including the portion 41 turns the impeller arm 31 against resistance the normally cylindrical pieces 43 are deformed as indicated in Fig. IV. If the impeller arm 31 drives the shaft portion 41 the pieces 43 are deformed in an opposite manner.

While the average speed of rotation of the impeller arm 31 is the same as the average rotational speed of the drive shaft 19, deformation of the pieces 43 permits the impeller arm 31, to a small degree, momentarily to overrun or lag behind the drive shaft. When the mechanism is operating, slight overrunning and lagging occurs during every vibration cycle without setting up appreciable torsional stress in the shaft 19 or transmitting appreciable stress to the motor or to gearing connecting the motor to the drive shaft 19. Stresses which otherwise would be set up in the impeller arm 31 and in the yoke 32 and pressures which otherwise would be set up in the bearings at the spindles 35 and 36 are almost completely avoided in the mechanism of this inveniton. Even extraordinary stresses and pressures resulting from dropping of heavy objects upon the grid 14 or tumbling them about which would be set up and transmitted in similar mechanism having the impeller arm rigidly fixed to the driving shaft are minimized to insignificance by the flexible coupling illustrated in Figs. III and IV. This flexible coupling smooths away the peak intensities of stresses resulting from shocks as well as stresses resulting from vibration. The result is a weight and roller unit and a drive shaft revolving and rotating at the same r.p.m. but whose relative instantaneous speeds are seldom the same.

Fig. V illustrates a modification in which the results obtained by the form of means disclosed in Figs. III and IV are attained in mechanism having an impeller arm 31a fixed to a drive shaft 19a. In the form of device illustrated by Fig. V the hinge between the impeller arm 31a and the yoke 32a contains a highly deformable sleeve 44a consisting of rubber or rubbery material having a series of longitudinal perforations 45a extending therethrough. If desired the sleeve may be made flexible by honeycombing or foaming instead of by being perforated. The sleeve 44a is slightly compressed and is held in a bore extending through the impeller arm 31a by cohesive vulcanization or any other suitable fastening means. Fastened within the sleeve 44a is a bushing 46a which rockably receives a pintle 47a that constitutes a part of the yoke 32a.

In the modification illustrated by Fig. VI the impeller arm 31b is a curved flat spring one end of which is fixed to the drive shaft 19b while the other end is fixed to a bushing 46b which serves as a rock shaft bearing for a pintle 47b that constitutes a part of the yoke 32b. The curved spring impeller arm 31b accomplishes the same general purpose as the stiff impeller arms and flexible couplings illustrated in Figs. III and V and described above.

Fig. VII shows a form of the vibration imparting device in which the weight and roller unit consists essentially of a single roller 25c that rolls around the inside of a single track 17c. In the form shown in Fig. VII two impeller arms 31c are fixed at their inner ends to a drive shaft 19c while their outer ends carry bearings (which preferably are of the tapered roller type) in which are journalled spindles 35c projecting axially from the roller 25c.

Tapered roller bearings may be employed in the main shaft journals and elsewhere if desired in any of the modifications of the vibration imparting mechanism. In the form shown in Fig. VII they absorb whatever end thrust may develop if the roller 25c should tend to wander on the track 17c and the impeller arms 31c, though resilient enough to permit variations in relative revolutional speeds of the roller 25c and the drive shaft 19c, are stiff enough laterally to keep the roller from shifting axially unless it is deflected by some unusual shock or interference.

To guard against excessive side movements the roller 25c may be provided with guard flanges 49c which usually do not engage the track but may do so if the roller shifts too far.

The vibration imparting mechanism as so far described tends to impart orbital vibration to any mass to which its annular tracks are rigidly fixed. A mass may be so supported and its movement so checked that it can vibrate only rectilinearly. If the mass is so supported and its movement is so checked the mechanism hereinbefore described can be employed to cause the mass to vibrate in straight paths.

The mechanism of the instant invention can also be constructed and arranged to tend to impart straight line vibration to any mass to which its annular tracks are rigidly fixed. This can be done by gearing two drive shafts together to turn in opposite directions at equal speeds and by coordinating the movements of two weight and roller units revolved by the drive shafts so that their combined center of gravity will reciprocate rectilinearly along a straight line as indicated diagrammatically in Fig. IX.

Nearly straight line vibration is often desirable in a vibratory conveyor particularly in a long conveyor all parts of which throughout its length should vibrate synchronously in parallel paths. The conveyor illustrated by Fig. VIII has a base 51d to which are fixed the lower ends of helical springs 52d which support a mass 53d to be vibrated. The mass to be vibrated consists of a long trough 54d to which the upper ends of the helical springs 52d are fastened. The trough 54d has a frame 55d for locating and orienting the helical springs 52d and such check links 56d as may be required to hold the mass 53 from movement other than in short nearly straight arcs. The conveyor so far described is of well known construction.

Fixed to a frame 58d in the positions indicated in Fig. VIII are two rigid housings 16d within each of which are annular tracks which may be identical with the tracks 17 and 18 shown in Fig. II. Drive shafts 19d geared together to turn at equal speeds in opposite directions are journalled in bearings in the end walls of the housings and extend into the housings each of which contains mechanism substantially identical with that illustrated in Figs. II, III and IV and hereinbefore described. When the drive shafts rotate, the roller weight units and their combined center of gravity move in the manner diagrammed in Fig. IX, thus imparting impulses to the mass 53d in directions which closely parallel the arcs in which the mass 53d can vibrate.

Any suitable form of gearing may be employed between the shafts 19d. For simplicity of illustration identical spur gears 57d are shown as fixed to the shafts and meshing with each other. Either the motion smoothing means shown in Figs. III and IV, or that shown in Fig. V or that shown in Fig. VI may be employed in the dual straight line impulse imparter shown in Fig. IX.

With the structure shown in Fig. VII guide flanges 49c were employed to definitely limit axial movement of the rolling weight 25c. Equivalent results may be achieved by making the drive arms rigid with respect to the drive shaft and of sufficient strength to withstand the end thrust and providing radial thrust bearings for both the drive shaft and the rolling weight. Thus, in Fig. X a drive shaft 19e is journaled in tapered roller bearings 60, the inner races of which abut shoulders 61 of the drive shaft 19e and the outer races of which are held against axial movement by end caps 62 fastened to end bells 22e of the housing 16e. A limited amount of radial and axial movement of the bearings 60 is permitted by cushioning material 63, of rubber or similar material, interposed between the outer bearing races and the caps 62. Sturdy arms 64 rigidly attached to the shaft 19e carry bearings 65, similar to the bearings 60, the inner races of which are fitted onto spindles projecting axially from the rolling weight 24e. The bearings 65 are resiliently supported in the arms 64 to minimize the transmission of shock forces to or from the arms 64 to the rolling weight 24e.

In the design and construction of this structure it is advisable to proportion the parts so that a small radial force is exerted by the arms 64 against the weight 24e. This force serves to ensure that the rolling weight 24e is always in contact with the housing 16e and to partially relieve the shaft bearings 60 from the centrifugal force exerted by the weight of the arms 64.

In this form of the invention, as well as in the others, it is desirable, insofar as possible, to minimize or eliminate endwise creep of the rolling weight 24e. Since the rolling weight tends to creep endwise in proportion to its lack of parallelism with the axis of the housing 16e great care must be exercised to keep the arms 64 in precise alignment with each other and to keep the bearings 65 properly mounted in the arms 64.

In all the forms of the invention the rolling weight is allowed, within the range of movement allowed by the mounting of the bearings 65, to lag or lead the shaft 19e. This freedom is required to reduce the oscillatory torsional force transmitted to the shaft 19e when the housing 16 vibrates along a straight line or a closed curve other than a circle. Without this freedom the arms 64 transmit substantial oscillatory force to the shaft and drive means. The resilient drive also minimizes any torsional strain resulting from sudden displacements of the housing 16 occurring when the drive arms are extended at right angles to the path of the displacement. The torsional strain occurs when the drive shaft 19 is moved with the sudden displacement and the weight does not move accordingly.

The forms of the invention hereinabove described and illustrated in the accompanying drawings are exemplary only and the invention may be embodied in other forms and modifications within the spirit and scope of the subjoined claims.

We claim:

1. Vibratory mechanism comprising, in combination, a mass to be vibrated, an annular track rigidly fixed to and constituting a part of said mass, a weight and roller unit including a roller adapted to roll around the inside of said annular track, a drive shaft, a bearing concentric with the annular track for journaling said drive shaft upon said mass, means for reducing peak intensities of forces nonconstantly transmitted to said bearing, impeller means revolved by said drive shaft for rolling said roller around the inside of said annular track and a torsionally resilient coupling drivingly connecting said impeller means and said drive shaft.

2. Vibratory mechanism comprising, in combination, a mass to be vibrated, annular tracks rigidly fixed to and constituting parts of said mass, a weight and roller unit including coaxial rollers adapted to roll around the insides of said annular tracks, a drive shaft, bearings concentric with said tracks for journaling said drive shaft upon said mass, means for reducing peak intensities of forces nonconstantly transmitted to said bearings, impeller means revolved by said drive shaft for rolling said rollers around the insides of said annular tracks and a torsionally resilient coupling drivingly connecting said impeller means and said drive shaft.

3. Vibratory mechanism comprising, in combination, a mass to be vibrated, annular tracks rigidly fixed to and constituting parts of said mass, a weight including coaxial rollers adapted to roll around the insides of said annular tracks, a drive shaft, bearings concentric with said annular tracks for journaling said drive shaft upon said mass, means for reducing peak intensities of forces nonconstantly transmitted to said bearings, impeller means revolved by said drive shaft for rolling said rollers around the insides of said annular tracks, said impeller means comprising a yoke swivelly connected to each of said rollers at its axis, an impeller arm revolved by drive shaft and a pivotal connection from said impeller arm to said yoke, and a torsionally resilient coupling drivingly connecting said impeller means and said drive shaft.

4. The vibratory mechanism defined in claim 3 in which the torsionally resilient coupling consists of a drive shaft portion which is polygonal in cross section loosely received in a much larger polygonal opening in said impeller arm with pieces of highly deformable elastic material interposed between said drive shaft portion and the walls of said polygonal openings.

5. The vibratory mechanism defined in claim 1 in which the torsionally resilient coupling drivingly connecting said impeller means and said drive shaft includes elastically deformable material interposed between said impeller means and said weight and roller unit.

6. The vibratory mechanism defined in claim 1 in which the torsionally resilient coupling drivingly connecting said impeller means and said drive shaft includes a sleeve of elastically deformable material interposed between said impeller means and said weight and roller unit.

7. The vibratory mechanism defined in claim 3 in which the torsionally resilient coupling drivingly connecting said impeller means and said drive shaft includes a sleeve of elastically deformable material incorporated in said pivotal connection from said impeller arm to said yoke.

8. The vibratory mechanism defined in claim 1 in which the torsionally resilient coupling drivingly connecting said impeller means and said drive shaft consists of an element of said impeller means in the form of a curved spring.

9. Vibratory mechanism comprising, in combination, a mass to be vibrated, annular tracks rigidly fixed to and constituting parts of said mass, a weight including coaxial rollers adapted to roll around the insides of said annular tracks, a drive shaft, bearings journaling said drive shaft upon said mass, means for reducing peak intensities of forces nonconstantly transmitted to said bearings, impeller means revolved by said drive shaft for rolling said rollers around the insides of said annular tracks, said impeller means comprising a yoke swivelly connected to each of said rollers at its axis, an impeller arm revolved by said drive shaft and a pivotal connection from said impeller arm to said yoke, said impeller arm being in the form of a curved spring.

10. Vibratory mechanism comprising, in combination, a mass to be vibrated, two parallel drive shafts, bearings journaling said parallel shafts upon said mass, an annular track surrounding and concentric with each of said parallel shafts, two weight and roller units each including a roller adapted to roll around the inside of one of said annular tracks, means for turning said drive shafts in opposite directions at equal speeds, two impeller means revolved in opposite directions by said drive shafts for rolling said rollers at equal speeds in opposite directions around the insides of said annular tracks, said impeller means and said rollers being so oriented that the composite center of gravity of said weights reciprocates substantially rectilinearly, a torsionally resilient coupling drivingly connecting said impeller means to said drive shafts.

11. Vibratory mechanism comprising, in combination, a mass to be vibrated, two parallel drive shafts, bearings journaling said parallel shafts upon said mass, a pair of annular tracks surrounding and concentric with each of said parallel shafts, two weight and roller units each including a pair of coaxial rollers adapted to roll around the inside of one pair of said annular tracks, means for turning said drive shafts in opposite directions at equal speeds, two impeller means revolved in opposite directions by said drive shafts for rolling said pairs of rollers at equal speeds in opposite directions around the insides of said pairs of annular tracks, said impeller means and said pairs of rollers being so oriented that the composite center of gravity of said weights reciprocates substantially rectilinearly, and torsionally resilient couplings drivingly connecting said impeller means and said drive shafts.

12. Vibratory mechanism comprising, in combination, a mass to be vibrated, two parallel drive shafts, bearings journaling said parallel shafts upon said mass, an annular track surrounding and concentric with each of said parallel shafts two weight and roller units each including a roller adapted to roll around the inside of one of said annular tracks, means for turning said drive shafts in opposite directions at equal speeds, two impeller means revolved in opposite directions by said drive shafts for rolling said rollers at equal speeds in opposite directions around the insides of said annular tracks, said impeller means and said rollers being so oriented that the composite center of gravity of said weights reciprocates substantially rectilinearly, said impeller means comprising a yoke swivelly connected to each of said weights at the axis of each of said pair of rollers, an impeller arm revolved by each of said drive shafts and a pivotal connection from each of said impeller arms to one of said yokes and means for minimizing variations in torsional and radial forces acting through said impeller means upon said drive shafts and said bearings.

13. Vibratory mechanism comprising, in combination, a mass to be vibrated, two parallel drive shafts, bearings journaling said parallel shafts upon said mass, an annular track surrounding and concentric with each of said parallel shafts, two weight and roller units each including a roller adapted to roll around the inside of one of said annular tracks, means for turning said drive shafts in opposite directions at equal speeds, two impeller means revolved in opposite directions by said drive shafts for rolling said rollers at equal speeds in opposite directions around the insides of said annular tracks, said impeller means and said rollers being so oriented that the composite center of gravity of said weights reciprocates substantially rectilinearly, said impeller means comprising a yoke swivelly connected to each of said weights at the axis of each of said pair of rollers, and a curved resilient impeller arm revolved by each of said drive shafts and a pivotal connection from each of said impeller arms to one of said yokes.

14. The vibratory mechanism defined in claim 12 in which the means for minimizing variations in torsional and radial forces acting through said impeller means includes a sleeve of elastically deformable material incorporated in the pivotal connection from each of said impeller arms to one of said yokes.

15. Vibratory mechanism comprising, in combination, a mass to be vibrated, an annular track fixed to and forming part of said mass, a drive shaft journaled in said mass concentric with said annular track, a roller adapted to roll on said annular track, a yoke engaging said roller for pulling and guiding said roller along said track, and an axially stiff torsionally resilient arm extending from said shaft and engaging said yoke for transmitting power from said shaft to said roller.

References Cited in the file of this patent

UNITED STATES PATENTS

| | | |
|---|---|---|
| 1,719,123 | Mitchell | July 2, 1929 |
| 1,733,373 | Jubien et al. | Oct. 29, 1929 |
| 2,127,317 | Welch | Aug. 16, 1938 |
| 2,526,414 | Rebut | Oct. 17, 1950 |
| 2,563,778 | Fasoli | Aug. 7, 1951 |
| 2,712,742 | Niedhart | July 12, 1955 |
| 2,766,629 | Booth | Oct. 16, 1956 |
| 2,831,353 | Ongaro | Apr. 22, 1958 |

FOREIGN PATENTS

| | | |
|---|---|---|
| 107,710 | Germany | Dec. 29, 1899 |
| 840,588 | France | Jan. 16, 1939 |